United States Patent
A. C. et al.

(10) Patent No.: US 10,650,016 B2
(45) Date of Patent: *May 12, 2020

(54) DATA INGESTION PROCESS

(71) Applicant: International Business Machines Corporation, Armonk, NY (US)

(72) Inventors: Charan A. C., Siddapur (IN); Santosh Hegde, Bangalore (IN); Mohan Narayanaswamy, Bangalore (IN); Gaurav Saxena, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/060,637

(22) Filed: Mar. 4, 2016

(65) Prior Publication Data

US 2016/0299957 A1     Oct. 13, 2016

Related U.S. Application Data

(63) Continuation of application No. 14/682,234, filed on Apr. 9, 2015.

(51) Int. Cl.
*G06F 16/25* (2019.01)

(52) U.S. Cl.
CPC .................. *G06F 16/254* (2019.01)

(58) Field of Classification Search
None
See application file for complete search history.

(56) References Cited

U.S. PATENT DOCUMENTS

| | | | |
|---|---|---|---|
| 6,055,525 A * | 4/2000 | Nusbickel | G06F 16/258 |
| 8,219,998 B2 | 7/2012 | Taylor et al. | |
| 8,224,771 B2 | 7/2012 | Kresina | |
| 8,250,182 B2 | 8/2012 | Frank et al. | |
| 8,364,751 B2 | 1/2013 | Meijer et al. | |
| 8,370,312 B1 * | 2/2013 | Sawhney | H04L 67/1097 |
| | | | 707/694 |
| 8,572,163 B1 | 10/2013 | Bromley et al. | |
| 8,719,250 B2 * | 5/2014 | Chong | G06F 16/2455 |
| | | | 707/713 |
| 9,148,454 B1 | 9/2015 | Sharma et al. | |
| 9,720,989 B2 * | 8/2017 | Theimer | G06F 16/258 |
| 2009/0204711 A1 | 8/2009 | Binyamin | |
| 2011/0016095 A1 | 1/2011 | Anglin et al. | |

(Continued)

OTHER PUBLICATIONS

Charan A.C. et al., "Data Ingestion Process" U.S. Appl. No. 14/682,234, filed Apr. 9, 2015.

(Continued)

*Primary Examiner* — Mark D Featherstone
*Assistant Examiner* — Ranjit P Doraiswamy
(74) *Attorney, Agent, or Firm* — Stephen R. Yoder; David B. Woycechowsky (57) ABSTRACT

A method, system and computer program product is disclosed for performing data ingestion. A request is received for data ingestion. Based on the request received, a client resource information with a server resource information is compared. After the comparing of client resource information with server resource information, location for formatting of data during data ingestion is determined. Further, in response to the determination of location, formatting of the data is performed at the determined location.

3 Claims, 4 Drawing Sheets

(56) References Cited

U.S. PATENT DOCUMENTS

| | | | | |
|---|---|---|---|---|
| 2012/0110582 A1* | 5/2012 | Ferdous | .............. | G06F 11/3442 |
| | | | | 718/101 |
| 2012/0271948 A1 | 10/2012 | Martin | | |
| 2012/0291041 A1* | 11/2012 | Cipar | .................... | G06F 9/5011 |
| | | | | 718/104 |
| 2015/0142861 A1* | 5/2015 | Gaddipati | ......... | G06F 17/30091 |
| | | | | 707/812 |
| 2015/0324255 A1* | 11/2015 | Kochunni | ........... | G06F 11/1448 |
| | | | | 711/162 |

OTHER PUBLICATIONS

"System and Method for Dynamic Distribution of Workload in Client-Server Run-time Environment", An IP.com Prior Art Database Technical Disclosure, Authors et. al.: Disclosed Anonymously, IP.com No. IPCOM000224372D, IP.com Electronic Publication: Dec. 14, 2012, pp. 1-8.

Appendix P—List of IBM Patents or Patent Applications Treated as Related, Filed Aug. 24, 2016, 2 pages.

\* cited by examiner

DATA INGESTION PROCESS

BACKGROUND

The present invention relates to data ingestion, and more specifically to dynamically performing data ingestion process.

Data ingestion is a process of obtaining, importing, and processing data for later use or storage in a database. The process often involves altering individual files by editing their content and/or formatting them to fit into a larger document. In other words, data ingestion typically prepares data for doing analytics on it. The operation often involves a sequence of processes to be performed. The operation transforms data to a format consistent with the format of the database storing the data for analytics purposes. During data ingestion processing, data is read to be parsed, formatted and loaded from source systems for storing into a storage device, such as database. Each of these processes during data ingestion operation typically require huge consumption of computational-related resources of the devices/tools involved in execution.

In some computing scenarios, a server may perform the operation on behalf of a client or server may assign some of the operation to be carried out by client itself. In some scenarios, server may notify client of an operation result, and in other scenarios, server may generate a result data set to be stored in the database. Still, in some scenarios, the server may direct the client to perform all the processes at the client location before transferring the data for storage in the database.

Data load tools are typically deployed on either client (source) or server (target) for execution during data ingestion. The server requests data load tools to perform predefined assigned tasks (workloads) at fixed locations. At times, server may require the tools to perform some processes such as reading, parsing and conversion on client, followed by data insertion at server location or may require all processes of reading, parsing, conversion and insertion to be executed at server itself. Due to the fact that the location (also called computational resource set) for data ingestion is fixed, data load tools, on either client or server, keep performing loading operations without consideration of available system resources.

SUMMARY

According to an aspect of the present invention, there is a method, computer program product and/or system for performing data ingestion that performs the following operations (not necessarily in the following order): (i) receiving a request for data ingestion; (ii) receiving a plurality of computational resource information respectively providing information about current resource(s) availability for a plurality of computational resource sets; (iii) responsive to the request for data ingestion, comparing the plurality of computational resource information to each other to determine a selected computational resource set based at least in part upon current resource(s) availability; and (iv) in response to the determination of a selected computational resource set, sending data for the requested data ingestion to the selected computational resource set.

BRIEF DESCRIPTION OF THE DRAWINGS

Through the more detailed description of some embodiments of the present disclosure in the accompanying drawings, various characteristics, features and advantages of the present disclosure will become more apparent, wherein the same reference generally refers to the same components in the embodiments of the present disclosure. The various features of the drawings are illustrations for clarity and not to scale.

DETAILED DESCRIPTION

As a result of huge resource consumption, it is preferred to accomplish respective tasks during a period of relatively low system use. While ingestion operation is under process, there may be other tasks also getting executed by the tools. As a result, performing execution of the data ingestion operations may consume a lot of time, due to variation in resource availability across respective locations. Therefore, to maintain a reasonable speed and efficiency of the tools performing data loading tasks/operations, remains a major challenge during data ingestion operation.

The embodiments herein provide a method, system and computer program product for performing data ingestion.

In one embodiment, a request is received for data ingestion. Based on the request received, a client resource information with a server resource information is compared. After the comparing of client resource information with server resource information, location for formatting of data during data ingestion is determined. Further, in response to the determination of location, formatting of the data is performed at the determined location.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

An overview of the description will be set forth in the following paragraphs.

Terms data loading and data ingestion may be used interchangeably.

Before any analytics can be performed on data, data is inputted in a format of a database storing it. Any delay in loading may hamper effecting analysis on the data. Primarily data ingestion process may require reading data, parsing of data for loading, converting into a format of a database storing it, followed by storing in the database. Each of the processes other than storing for data analysis in a database can be performed at either client (source) and/or server (target). A decision as to where data ingestion operation may be rendered, depends upon available resources and/or workloads of respective devices. Once a location is assigned, execution of processes during data ingestion can continue at a predefined location.

The present invention is directed towards exchanging client and server resource information to determine whether data ingestion operations such as reading and/or parsing and/or formatting, be performed at either client and/or server locations. Further, based on change in resource availability across another location, execution of data ingestion operation may switch during the continuance of the carrying out of a single data ingestion operation. In other words, client or the server may offload partially executed data ingestion processes to one another based on resource availability at another location. Method of determining whether there may be switch in location during a data ingestion operation based on change in resource availability is described below.

A detailed description of one, or more, embodiments, will be provided in the following paragraphs.

Data ingestion operation is a formatting process that involves reading, parsing, conversion from a text format or an ASCII format to database storage format and insertion of formatted data in the storage database. Data should be ingested as soon as it is generated. As size of data grows, a speed of data ingestion decides how fast usable insights can be obtained from data, as no analytics can run on data until data loading is complete.

Once loading of data is in process, there can be several factors which may cause a delay in completion of processes during data ingestion operation. Several factors can be exhaustion of available resources, reduced bandwidth or limited memory etc. If the data ingestion is fixed to be performed by either of a predefined source (client) or target (server) locations, constrained server or client resources and/or workloads etc. can slow the completion of the data ingestion operation.

Therefore, there is a need for a system that can provide an enhanced execution of data ingestion operation. The location where the data ingestion operation may keep performing can be controlled according to workloads, resource availability, policies, data file types, conditions, configuration settings of various devices involved in data ingestion operations.

Some preferable embodiments will be described in more detail with a reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Figure 1:
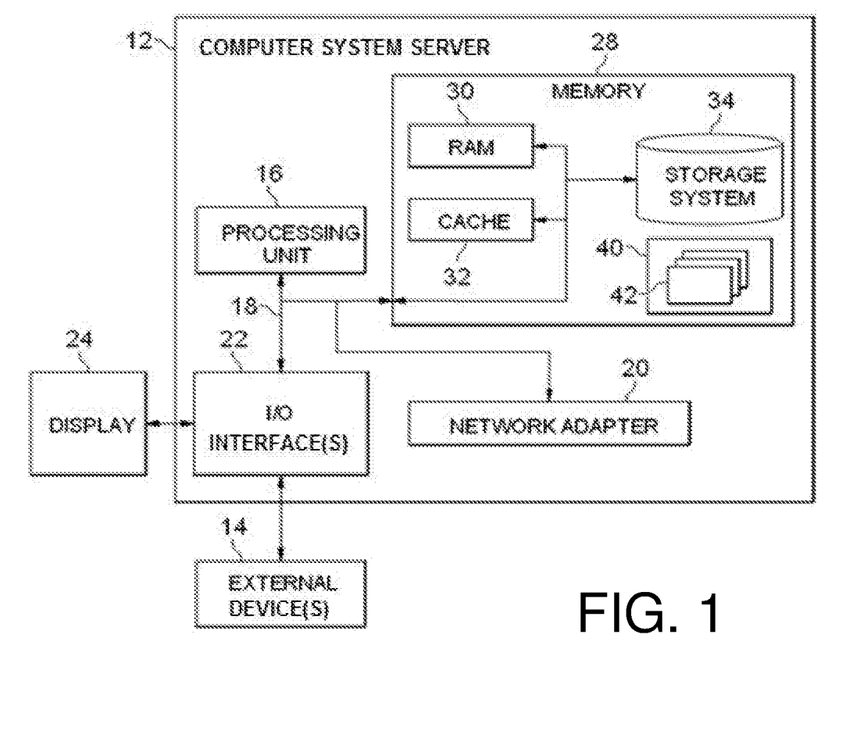
FIG. 1 illustrates a block diagram of a first embodiment of a computer system (including server 12) which is suitable for implementing some embodiments of the present invention.

Referring now to FIG. 1, in which a block diagram of an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including the system memory 28 and the processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments herein provide several options for performing data ingestion operations. Discussion will begin with a process to determine resource information across devices which may be involved in execution of data ingestion operation. Discussion will then turn to an example process of analyzing resource information across devices for deciding on a location of execution of data ingestion operations, followed by a determination on continuation of data ingestion operation at the determined location. Finally, an example system of an environment for performing data ingestion operation is explained.

Embodiments herein can determine workload and resource capabilities of the devices during data ingestion operations such that operations can continue to perform across locations having available resources. In one embodiment, during a single data ingestion operation, based on a determination of available resources across another location, various processes may switch to execute partially formatted operations at another location, for better efficiency and throughput.

Although the present invention describes various aspects in terms of a client (source) and a server (target), embodiments are not intended to be limited to a client-server implementations. Rather, the disclosed operations may be applicable to any solution involving data ingestion operations which require transformation and storing of data into a database.

Figure 2:
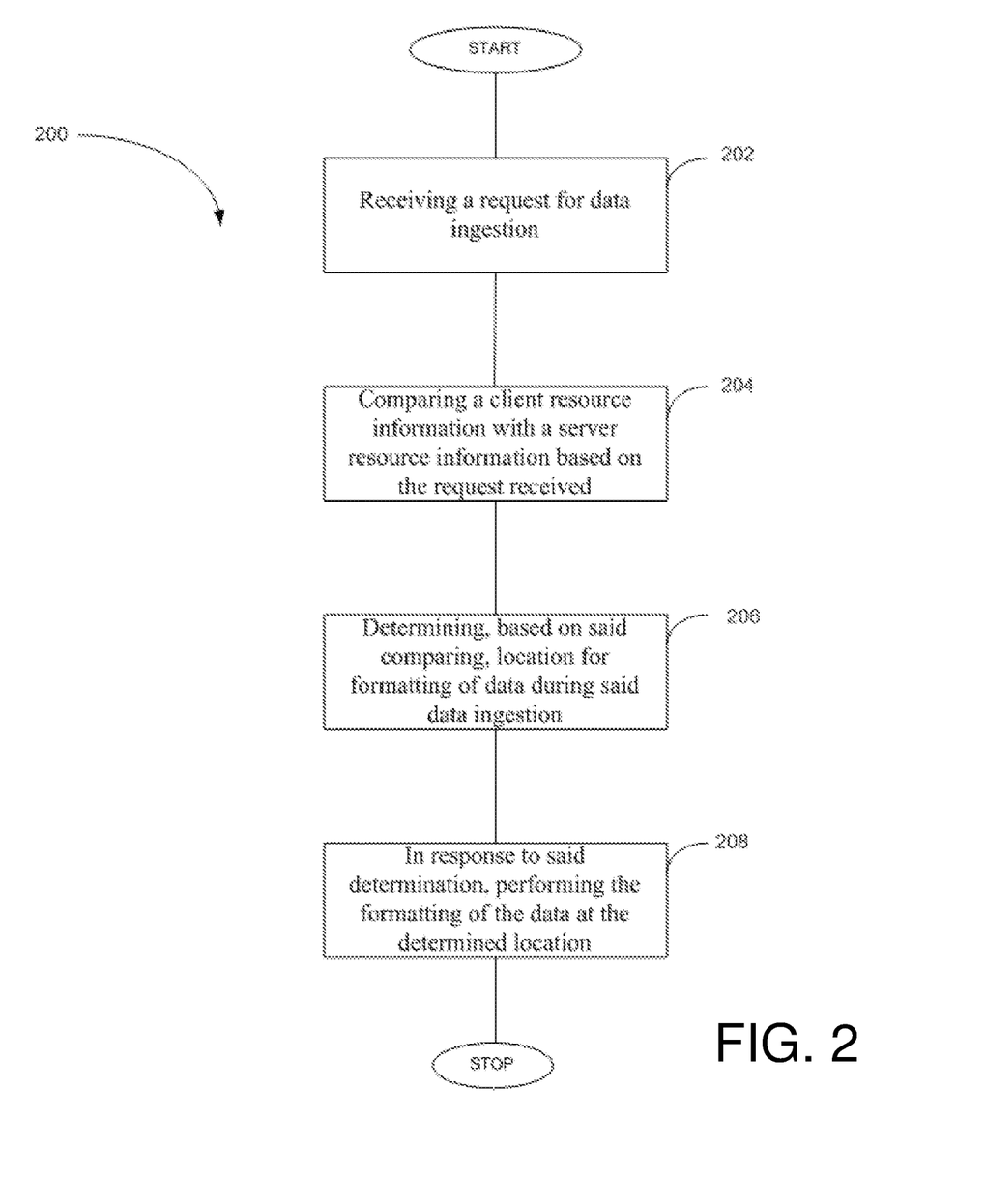
FIG. 2 illustrates a schematic flowchart depicting steps for performing data ingestion, according to one embodiment.

With reference now to FIG. 2, one embodiment provides a non-limiting mechanism for performing data ingestion at either a source (client) or a target (server) location in a distributed data loading environment. A source device may be connected to a target device, and/or to a storage device through a network.

The method for performing data ingestion operation comprises of following steps: in step 202, receiving a request for data ingestion; in step 204, comparing a client resource information with a server resource information based on the request received; in step 206, determining, based on said comparing, location for formatting of data during said data ingestion; and in step 208, in response to said determination, performing the formatting of the data at the determined location.

In step 202, a request for data ingestion is received. The request may be for data ingestion from a client (source) to a server (target). In one embodiment, the request may be from a user device. In another embodiment, the request may be initiated from a device for data ingestion to be executed at regular intervals. An initiation of a request to load data to a database may launch one or more data ingesting operations by server.

The request may require loading data obtainable in heterogeneous formats, such as digital objects and/or a data set having a logical set of files and/or directories. In one embodiment, data may include different types such as data files, media files, executable files, those used to implement software applications and operating systems, as well as files that are used or generated by such executable files, including files generated by user applications (e.g., word processing programs, email programs, graphics programs, database applications, or the like). In another example, data may include data in a registry and/or file system of a computing device. In yet another implementation, data can include data, typically arranged as a plurality of data tables, as well as indexes and other structures that facilitate access to the data.

Data to be ingested may be inputted as a single, chunk or bulk data. In an embodiment, where data is in bulk, it may be loaded as blocks (sets of data grouped together). Data blocks/chunks require parsing of bulk data into smaller units called as data blocks. In one example, parsing may be automatic or may be used defined.

In one embodiment, such a determination as to how data may be loaded, can be made from its data type. It may be determined which of the data can be loaded together or separately into a database. In some implementations, each data type may be inputted individually for data loading. In other implementations, data may be aggregated as chunks, such as similar types being aggregated together for formatting.

In some embodiments, data from a single source may be ingested. In other embodiments, data from various sources may be combined together for insertion. Such decision for grouping of data from various sources may be based on type and/or format of data at each source.

In some embodiments, data partitioning into data chunks may happen to conserve computing resources, such as bandwidth and storage. In one implementation, size of data blocks to be generated may be dependent on speed at which data may be loaded. In another implementation, frequency at which parsed data may be loaded is dependent upon available resources. Such partitions may be to improve the processing of the operation. In one embodiment, while looking at the type of data, availability of the resources at both the client side and the server side may be looked into, before the data to be inputted is converted into chunks/blocks of data.

In one embodiment, an agent of the source device or the target device is enabled to identify type of the data for internal conversion. In another embodiment, a user may decide whether single, chunk or bulk of data is to be parsed for data formatting.

In one embodiment, while the request for data ingestion is received, resource information pertaining to the device making the request (requesting client) is received alongside. In one embodiment, the requesting client may on its own send the resource information. In another embodiment, the server may ask the requesting client to provide the resource load information. In one embodiment, resource information may pertain to capability of available resources such as CPU, memory and other I/O devices etc., to execute data ingestion task of the requesting client. In another embodiment, the resource information may include information pertaining to workload tasks (schedule) of the requesting client device. In one embodiment, the source device, the target device, and the storage device (database), may have a common reference protocol to share information about data, workload and available resources with one another.

In one example, database may run in a physical environment or virtual environment. In one embodiment, database is a storage device that may be a part of one or more computing devices. In one embodiment, database may be located on the server and/or a cloud. Data may be stored using any suitable structure or data storage mechanism.

Based on resource information of the requesting client, server may decide on the manner for inputting data. Server may compute a frequency at which data may be committed during ingestion operation. In one embodiment a frequency at which data may be committed can be provided by user. A commit defines the frequency at which data is made permanent in the database during a single data ingestion operation, which involves reading, parsing, converting and storing into a database. The identified data (data streams) are converted from a text format to an internal format for storing in the database. The conversion step is transformation of data from a source format to a format of the storage database.

The data ingestion operation may be performed at either the source (client) and/or the target device. In one embodiment, complete operation may be executed at client for storing by the target device. In another embodiment, a partial operation may be executed at the client, followed by continuation of the same operation at the target device.

In an embodiment, loading of streams of data may be from a local database or a remote and may involve one or several feeding instances. In one embodiment, a frequency at which data may be loaded can be user defined or automatic. The frequency in one instance is a time interval at which set of data (groups of data streams), may be ingested during data ingestion. Set of data in one instance, may be units of data (which are parsed as data blocks) to be ingested. This may be at file level or node level.

In step 204, a client resource information with a server resource information is compared based on the request received for data ingestion operation. To generalize each location (or "computational resource set that is available for performing data processing provides "computational resource information set" indicating its respective current availability of computing resources. In this example, two computational resources information sets are compared to each other—one for the server location and one for the client location.

Due to data being inputted in various heterogeneous formats, conversion of data from a text format to a machine readable format (encoded) requires enough availability of resources. The resource information may refer to capability of a client device and/or a server device for accomplishing tasks such as processing, conversion and/or storage during data ingestion operation.

In one embodiment, server may compute capability of client and server devices to perform data ingestion operation. In one embodiment, a model system may be developed to analyze efficiency based on available resources to evaluate whether actions relating to data ingestion operation may be performed on either server and/or client (devices). Efficiency/performance of the device to be entrusted with the data ingestion operation may be determined based on resource information of the devices such as computing power of the server and/or the client; processing load on the client and the server (other than the operation); memory resources (both volatile and non-volatile) of the server and the client; location of set of data to be utilized during operation; network capacity of the client and the server; and an amount of data to be exchanged over the network while the formatting operation is in execution, to decide which of the devices has better efficiency.

Additionally, information on processing operations to be carried out, and triviality of the processing operations may also be looked into for computing efficiency. In one example, while analyzing, it may looked into whether server is performing any actions concurrently on behalf of other clients etc. For each of the client and/or the server, it may be determined which of the devices is currently running low on resources, such as processing power, memory or storage space and may not complete a task if assigned. Identified resources may thus, fail to perform the operation or provide a response to the operation. Furthermore, it may also be checked, if there can be any potential risk to remote processing due to network outage, power outage of the server, interception of packets by an untrusted intermediary, etc.

In one embodiment, while deciding on location of data ingestion operation, other factors such as work load tasks, data type, file type, time for scheduled tasks, file characteristics may be additionally considered. For example, it may be efficient to allocate processing of operation at client, sometimes in order to avoid network transport of a considerably large set of data e.g., if performing an operation on the server involves sending a large amount of data to the server, while processing the operation on the client might involve less consumption of network band-width.

In step 206, based on the above listed factors, client resource information is compared with the server resource information, to determinate on location for formatting of data during the data ingestion. In one embodiment, relation between resource availability and workload (tasks) may be developed for each of the devices involved. The relation may be used to compute efficiency based on leveraging information pertaining to (one or more factors) of each of the available resources, to determine a location for carrying out the data ingestion operation. Once a location is determined, data ingestion operation may be initiated for execution on the determined location which may be either of client or server.

In one embodiment, server may compute which of the client or server resources can better perform data ingestion operation. In another embodiment, server may utilize the model, which considers various factors as aforementioned, before deciding on choice of location. In one example, the model may develop a mathematical logic to find capability of the respective devices for determining on efficiency of resources involved, before deciding on location where data ingestion operation may effectuate execution. The logic may be a mathematical formulae that is applied for computation of efficiency of each device. In one embodiment, the logic may be automatically devised by the server itself based on comparing available resource loads on each of client and server devices, respectively. In another embodiment, resource capability of each of the resources of each of the devices involved may be considered. In one example, in case of server, the needs of other clients, may be considered while evaluating on resource availability as well as capability. In some embodiments, the logic may be provided by a user.

In one example, a correlation may be established between each of the resources available with workload tasks to be performed for both client and server resources. Based on analyzing the correlation, wherein it is determined that number of resources available for performing the task is more than the tasks to be performed, such resources are identified. From the identified resources, it is determined whether respective resources correspond to client or server locations. In one implementation, efficiency may be computed corresponding identified available resources, located on either client or server. Wherein efficiency corresponding to resources on one location is better than resources on another location, such a location is identified as a choice of initiating the data ingestion operation. In one embodiment, while computing efficiency, each of the aforementioned factors may be assigned separate weightages. A table may be generated containing information of values computed using various permutations and combinations of resources and workload tasks to be performed.

In other embodiments, it may be further decided, whether some portions of the data ingestion operation may be performed on client instead of server (or vice versa).

In step 208, in response to the determination of location, performing the formatting of the data at the determined location. Once determined, data ingestion operation is executed on the determined location.

In one embodiment, once the location is decided, entire data ingestion operation may be executed on the determined location. In some embodiments, it may be fixed which of the formatting processes may be executed at the determined location, before storing in the database. In one embodiment, while the data ingestion operation is in execution, it may be determined at intervals whether to continue carrying on execution process at the determined location. In one implementation, after a set of files/chunks have been in the process of undergoing various steps of formatting such as reading, parsing, transformation, it may be determined whether it would be appropriate to have the data ingestion operation continue at another location. For example, if found that there is change in resource availability across another device, and in order to achieve better throughput, will it be better to change a location of data ingestion operation to another location, while data ingestion operation is still in execution. Such a determination may happen at a trigger of an event. In one embodiment, such subsequent determination may be initiated automatically. For example, a trigger may be generated at an instance such as after an elapse of time since the operation is in execution or occurrence of a call back event. The call back event is a communication to a server, each time there is a change in resource availability across any of the devices involved for data ingestion. Such call back event may be triggered irrespective of the location where data ingestion is in progress. In such cases, server may be updated each time there is a change in resource availability across any of the devices. In yet another example, such a trigger for the event may initiate after a fixed amount of data has been ingested. In one embodiment, server may keep determining a preferred location during each commit. In some embodiments, even a user may initiate such subsequent determination.

In one embodiment, once server becomes aware of changes in available resources across another location, it may decide whether a partially executed operation may continue execution further on the determined location. Server may further determine efficiency based on the workload and resource availability across devices. In some embodiments, various other factors such as file size, file type, and bandwidth of the network connecting the client with the server, may be considered while computing efficiency to determine whether to continue performing the data ingestion operations at the determined location. In one embodiment, user preferences and/or user inputs may be taken into account while determining whether to continue performing at the determined location.

Server may perform further determination to evaluate if it is better to continue execution operation on the determined location or whether performance of the execution operation may get enhanced, if execution of the remaining task is switched to another location such that the resources available at another location would result in better throughput. Server may determine from the available resources information and/or workload tasks pending execution at each of the devices, whether efficiency in performance of data ingestion operation may be achieved advantageously if the remaining task is executed at the another location.

It may be determined as to how many resources are available on the device executing a process with that of another device not executing any process currently. For example, is availability of CPU proportional to the ingestion rate? Whether memory or Input/Output are enough to through the execution process. It may be determined if there is any need to partition the data being ingested into smaller units? It may also be determined whether data from several sources is being ingested together. It may also be determined whether there is any need to aggregate the data from several sources based on the type of data being inputted for formatting. It may be determined whether size of data chunks is not causing any delay in processing. Whether increase in the number of partitions is better than ingesting bulk data. It may also be determined whether it is ideal to do bulk ingestion rather than partitioning. It may be further determined whether there are enough resources to aggregate the data later. It may also be determined which location provides for better management of resources. One or all these factors may be considered, to establish efficiency corresponding to each location.

While making analysis, it may be considered whether another device may be enabled to take up the remaining task. In one embodiment, it may be determined if any of the data ingestion processes have completed or are nearing completion. For example, server may identify which of the existing processes such as reading and parsing of data into chunks have completed on the determined location and which of the processes remaining may get executed at another location of data ingestion operation.

In one embodiment, each steps of formatting such as reading, parsing, conversion and storage may be disjointed, such that events in one process are not blocked by another process operators.

In one embodiment, it may be determined whether executing device and another device may be able to synchronize execution process with one another. For example, will the remaining task get executed on causing partially switching of execution process on another device? In one example, a determination for execution of data ingestion operation may be for a single data ingestion operation. Once such a determination is complete, there may be dynamic switching of a partially performed formatting of the data to another location. After the location has been changed, execution of remaining formatting of the data may continue at another location. In one embodiment, a partially performed data ingestion operation may continue execution of the remaining operation at another location.

In one embodiment, while such switching from one location to another location in under process, each of the devices may be enabled to read the available data such that there is no re-doing of the already executed task/operation. For example, based on a common protocol, each of the locations including the storage device are able to get insight of the execution process in real time. The protocol may be predefined which allows each of components (devices/resources) to share information.

Server may communicate with the requesting client and the data storage device, such that the information is in sync in real time in all the respective devices. In one embodiment, while data ingestion operation is in execution, server keeps updating the information pertaining to the execution of data ingestion operation.

In one embodiment, there may be automatic switching of operation from one location to another location, such that speed and efficiency of operation may be enhanced and lead to better utilization of available resources.

In one embodiment such an event may be performed after a set of files (based on each type of data) or a block of data sets, or portions of a single file or a single file a data stream are in operation. Rules can be built into, to determine a workload plan and its execution to determine if data components (devices/resources) involved in the process of ingestion operation determine a stage of formatting and a status of execution for syncing.

In one embodiment, server may be enabled to differentiate if a request is a new request by a client device/or user or that the request is based on a predefined event, such as repeating a data ingestion operation for each of data blocks created by partitioning or at periodic intervals. In yet another embodiment, server may perform such a determination at random.

The above embodiments and implementations may combine together and cross-reference, thereby resulting in more embodiments.

Figure 3:
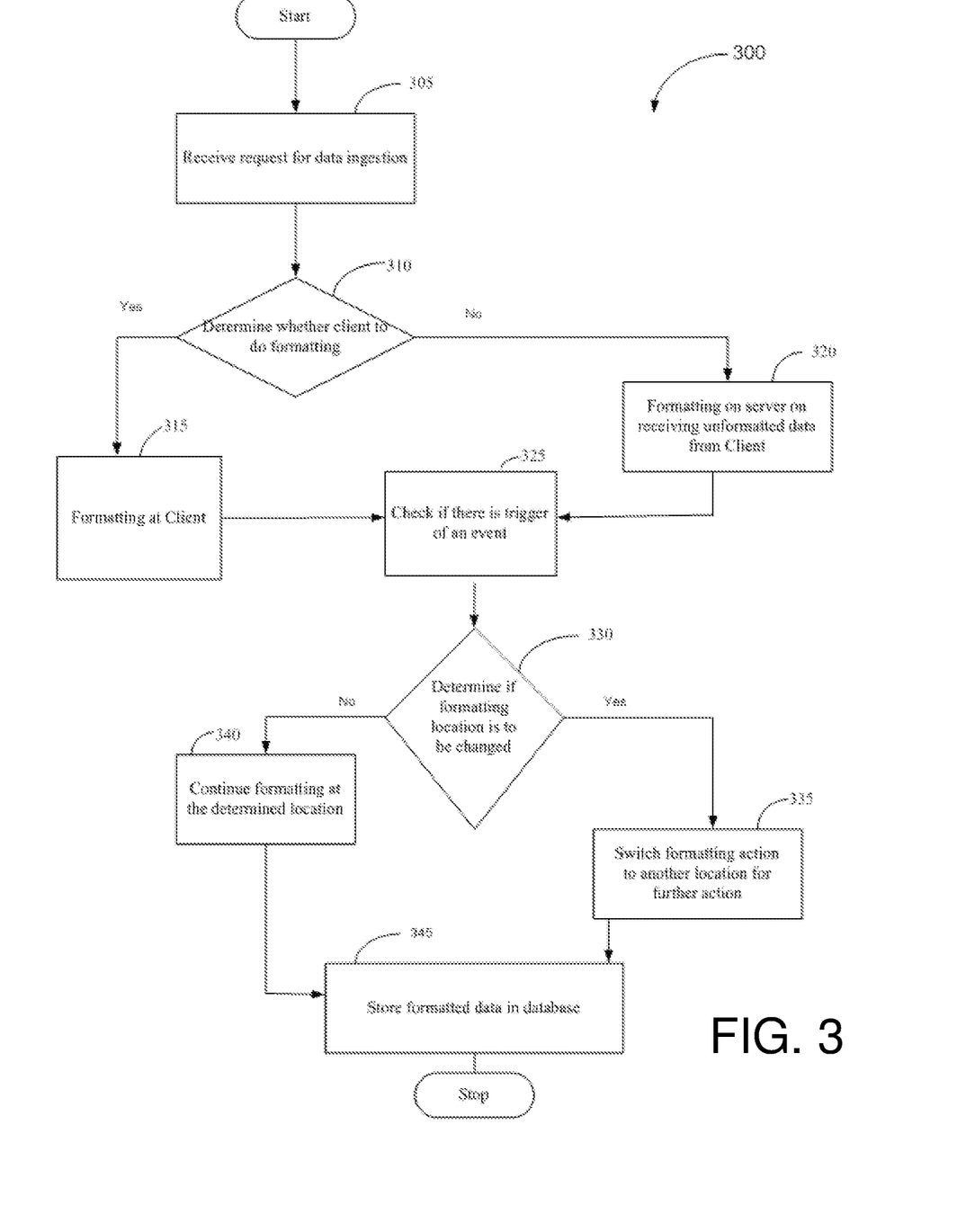
FIG. 3 illustrates an example process of determining whether to switch from one location to another location while data ingestion is in process, according to one embodiment.

With reference to FIG. 3, the embodiments provide a process 300 for performing data ingestion operation, according to one embodiment. The process 300 comprising:

At Step 305: receiving a request for data ingestion operation to store formatted data in a database. The request may be a new request or a new data block of an existing request from a single source or a plurality of sources. The request may be initiated by a user of a client device or from a device requesting data ingestion at periodic intervals. The request may be for loading of a heterogeneous data. The request may be for loading of any type of file from a local device into a database. The request may include resource information of the requesting device. Resource information may reflect on available resources such as CPU, memory and/or Input/output devices of the requesting client. The database may be located on a server and/or cloud.

At Step 310: Based on the received request, it may be determined where to perform formatting. The formatting may be performed at either of the server or client locations. In one embodiment, such a formatting operation may be performed on cloud when either of the client or server resides in cloud. Formatting is a data ingestion operation which includes the steps of reading, parsing and conversion of data before storing in a format of the database. The formatting operations may be carried at client (source) and/or server (target) location. The determination whether to do formatting is first fixed before initiating the data ingestion operation. The determination of location may be based on comparing the resource information of the client and server resources which may be involved in data ingestion operations. A correlation between resource load and efficiency may be established. The determination is to enable the server to determine the capability of the existing resources of the devices to ensure efficient and smoother execution of the data ingestion operation without delay. If it is determined that client is better equipped to execute data ingestion operation, move to step 315, else move to step 320.

At Step 315: once a determination is made that client is capable of executing a current task, the client is instructed to perform formatting operation such as reading, parsing and conversion of data at the client itself before sending the formatted to server for storage in a database.

At Step 320: If it is determined that server is better equipped to execute the task in hand, client is instructed to send unformatted data to server for performing data ingestion operation.

At Step 325: While the data ingestion operation is in execution, it may be checked if there is trigger of any event. In one event, the trigger may be generated when a server is communicated of a change in resource availability across another device. In another embodiment, such a trigger may be generated at periodic intervals.

At Step 330: Wherein it is observed that there is a trigger generated while data ingestion operation is in execution, it may be further determined if based on change in resource availability across devices, would it be better to continue formatting at the determined location or would it better to switch data ingestion operation to another location having more capabilities than current location for better through put of the data ingestion operation. Wherein it is established, that it would be better to perform operations at another location, move to step 335 else move to step 340.

At Step 335: Once it is determined, that resources are available at another location, there may be dynamic switching of a partially performed formatting of the data from the determined location to another location. At another location, data (formatted and unformatted or having got partially processed) of the determined location is synched with another location such that the remaining partial formatting of the data at another location is continued from a point where switching between the locations for execution of data ingestion operation happened.

At step 340: Once it is determined that despite trigger of an event, it is still better to continue data ingestion operation at the determined location, processing of data formatting may continue at the determined location.

At step 345: After data has been formatted as per the format of the data base of a data storage device, the data from various sources is aggregated for storing in the database. The database may be located at server or in cloud. The storage device remains in communication with the server and client while data ingestion is in execution.

Figure 4:
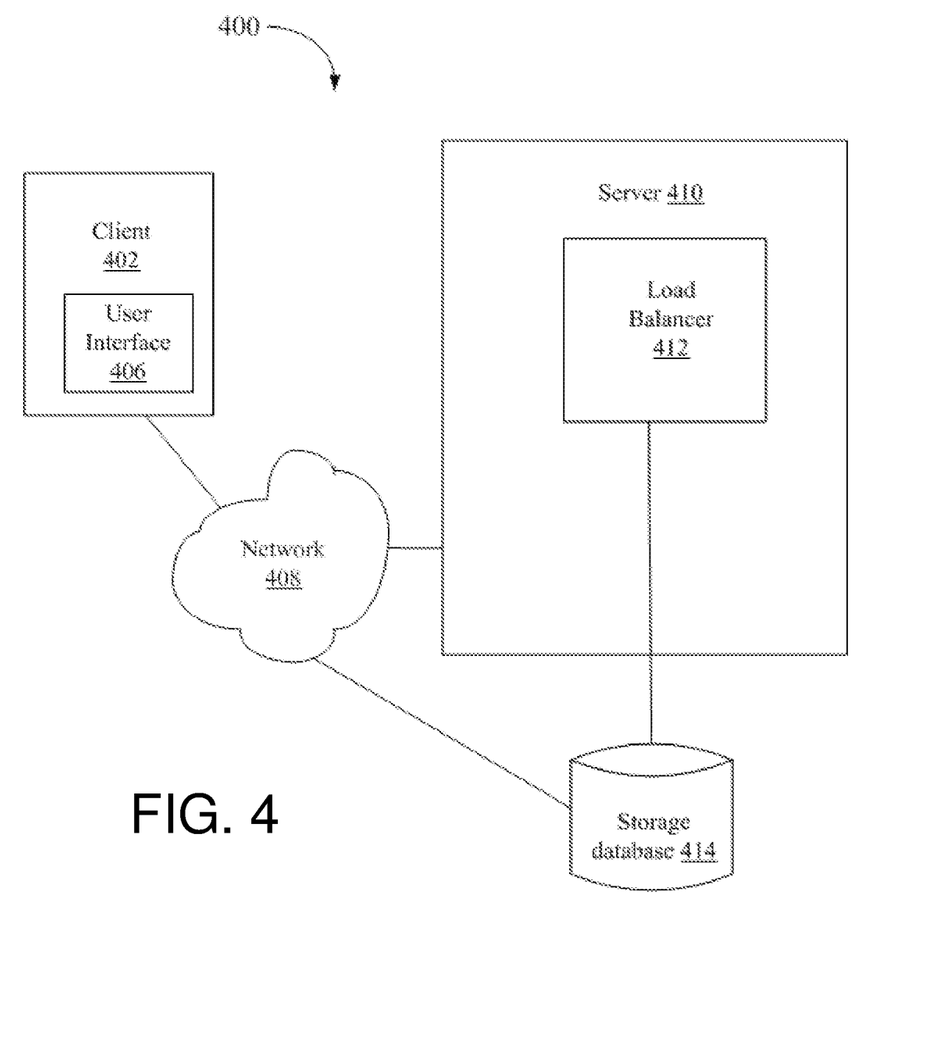
FIG. 4 illustrates a schematic structural diagram of an environment for performing data ingestion, according to one embodiment.

The various embodiments implementing the method have been described with respect to accompanying drawings. Those skilled in the art may understand that the method may be implemented in software, hardware or combinations of software and hardware. Moreover, those skilled in art may understand that by implementing various steps of the above method in software, hardware or combinations of software and hardware, there may be provided a data ingestion operation environment 400 in which example embodiments of the inventive subject matter may be practiced as shown.

In FIG. 4, a block diagram illustrates a data ingestion operation environment 400. The data ingestion operation environment 400 comprises a server 410 communicatively coupled via a network 408 to client 402. The environment 400 further comprises of storage 414.

In example embodiments, client 402 may comprise a plurality of client devices. In general, client 402 may represent any type or form of computing device capable of raising a request for at least one data ingestion process and server 410 may represent any type or form of computing device capable of receiving data for storing in a database. The server is enabled to receive unformatted or formatted data.

Client 402 may also represent any type or form of computing device capable of reading computer-executable instructions and performing one or more of client-side data ingestion processes/operations, described herein. Client 402 is an example of a client computational resource set. Examples of hardware included in client 402 may include, without limitation, laptops, desktops, servers, cellular phones, personal digital assistants (PDAs), multimedia players, embedded systems. Client 402 may also include data ingestion application capable of at least reading, parsing or formatting of data before transferring data to server for storing in storage device. Through a user interface 406, a text editor allows for raising a request. Through the user interface 406, user defined policies may be set. In an embodiment, through the user interface 406, a user may input a frequency at which there may be a commit. Also, the user may provide logic for computations.

Similarly, server 410 may also represent any type or form of computing device capable of reading computer-executable instructions and performing one or more of server-side data ingestion processes/operations, described herein. Server 410 is an example of a server computational resource set (see, definition of "computational resource set, below). Examples of hardware included in server 410 may include, without limitation, laptops, desktops, servers, cellular phones, personal digital assistants (PDAs), multimedia players, embedded systems. Server 410 is capable of receiving inputs from client 402 and also providing instructions to client 402 to perform an action as per the instructions. Server 410 is also capable of reading inputs as provided through user interface 406 of client 402. While receiving inputs and/or request from client 402, server 410 is capable of recognizing and performing an action accordingly.

The server 410 is a data ingestion system which may be confined to a single computer, but usually involves several computers computer systems (data loading servers and gateways) linked together over a communication network, such as internet 408 allowing exchange of information for execution of data ingestion operation. In general, client 402 may include the computer system 12 of FIG. 1 operated by a user. Server 410 may include the computer system 12 of FIG. 1.

In one example, server 410 may be a destination server for storing of formatted data, after data ingestion operation. In an embodiment, server 410 may receive unformatted data before data ingestion execution.

Network 408 generally represents any medium or architecture capable of facilitating communication or data transfer. Examples of network without limitation, includes an intranet, a wide area network (WAN), a local area network (LAN), a personal area network (PAN), the internet, power line communications (PLC), a cellular network (e.g., a GSM network), using wired or wireless connections. In one embodiment, network 408 may facilitate communication between client 402, server 410 and/or storage 414. Although not shown, in one embodiment, client 402 may be directly connected to server 410.

As illustrated in FIG. 4, a server 410 includes a data loading tool, a load balancer 412. In one embodiment, the load balancer 412 may be communicatively coupled to server 410. The load balancer 412 may follow instructions of server 410 for computing efficiency, required for data ingestion operation. Although not illustrated, load balancer 412 may directly communicate with client 402 and/or with storage 414. In one embodiment, load balancer 412, may communicate through server 410 with either client 402 and/or storage 414. Further, load balancer 412 is illustrated as being part of server, however, it may be an independent tool exchanging information in tandem with server 410, client 402 and storage 414 while aiding in processing of data ingestion operations. In another embodiment, load balancer 412 may be located on client 402 (not shown) and communicate with server 410. In yet another embodiment, a portion of the load balancer 412 may be located on client 402 and also on server 410.

Storage 414 may include one or more storage devices (not shown) in communication with one another. Storage 414 may generally represent any type or form of data storage device and/or medium (e.g., a computer-readable storage medium). Storage 414 may represent a portion of one or more computing devices. Data may be stored in storage 414 using any suitable data structure or data storage mechanism. In one example, storage 414 may include local data. In one embodiment, storage 414 may include rules, policies as provided by a user. In another embodiment, storage 414 may include the protocol for unifying and synching data being processed either from client 402 or server 410. In one embodiment, storage 414 may be configured to store information on each of the resources involved in data ingestion processing. The storage 414 may be updated in real time, as soon as there is change in resource availability across server 410 or client 402 resources involved in data ingestion operation.

The following example, shows how exemplary data ingestion operation environment 400 may be used to perform ingestion on data located on a client 402. In this example, reading data implies knowing the type of data to transform it to a structure consistent with the storage 414 requirements.

In one implementation, while interpreting data for parsing, and/or formatting and/or transformation, load balancer may be enabled to gather information on resources available with client 402 requesting for data loading and also server 410 configured to perform data ingestion. In another embodiment, load balancer 412 may be configured to track storage 414 to ascertain structure requirements for data to be transformed. In one embodiment, load balancer 412 may be configured to compute resource requirements for carrying out data ingestion operation.

In one embodiment, while computing on required resources for carrying our data ingestion operation, load balancer 412 may be configured to compare resources available with client 402 vis-a-vis server 410 resources. The load balancer 412 may be configured to determine location for data ingestion operation based on comparing available resources both at client 402 and server 410. In one implementation, while comparing client and server resources, load balancer 412 may further be configured to analyze work load tasks associated with resources to be involved in data ingestion operation. In another implementation, load balancer 412 may be configured to peruse user preferences if any. Additionally, load balancer 412 may be configured to take into account policies if any, while analyzing on resource requirements.

In one implementation, load balancer 412 may be configured to adopt a logic/mathematical formulae while determining which of the client or server resources are capable of executing data ingestion operation efficiently with better throughput. In one embodiment, load balancer 412 may maintain a table, containing various permutations and combinations of available resources for deciding on location, where data ingestion may initiate operation.

In one implementation, having fixed location, load balancer 412 may be configured to monitor available resources at client and server locations respectively. In one embodiment, each time there is a change in resource availability across any of the locations, load balancer 412 may be configured to communicate with server 410 to determine whether based on change in resource availability, should the location of execution of data ingestion operation change.

In one embodiment, load balancer 412 may communicate continuously with server 410, each time there is change in resource availability. In another embodiment, load balancer 412 may communicate with server 410 at the trigger of an event.

In one embodiment, load balancer 412 having determined that there is a need to change to another location for better efficiency, may cause dynamic switching of data ingestion operations from one location to another location. Load balancer 412 may be configured to keep the data ingestion operation continuously in progress while causing switching of operation from one location to another location. In one implementation, load balancer 412 may be configured to enable continuation of execution of operation at one location from a point where the switching happened from the determined location. In one embodiment, load balancer 412 may be configured to sync data of the determined location, another location and storage 414 in real time such that data is consistent in storage without any duplication.

While the foregoing embodiment chose between only two computational resource sets (specifically, server and client), other embodiments of the present disclosure: (i) may choose among and between more than two computational resource sets; and/or (ii) some, or all, of the computational resource sets may not be associated with a server (or service providing party) or a client (of a service providing party).

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the various embodiments have been provided for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or improvement over technologies found in the marketplace, or to enable others of ordinary skill in the art to understand the embodiments disclosed herein.

The following paragraphs set forth some definitions for certain words or terms for purposes of understanding and/or interpreting this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Computational resource set: any set of computing resources (such as storage, memory, processing capability and the like) suitable for performing data ingestion.

What is claimed is:

1. A method comprising:
   receiving, by a load balancer and from a data ingestion source system, a data ingestion job data set including information indicative of a description of a data ingestion job, with the description including a data type characteristic indicating the data type(s) of bulk data to be ingested into a database in the data ingestion job;
   determining that the bulk data to be ingested into the database in the data ingestion job needs to be divided into a plurality of data blocks, with each data block of the plurality of data blocks including the data type characteristic and a source location indication;
   determining a first location for formatting the plurality of data blocks based, at least part, upon a comparison of a client resource information data set and a server resource information data set;
   selecting, by the load balancer, a selected data ingestion hardware set, from a plurality of data ingestion hardware sets, for ingesting selected data blocks of the plurality of data blocks into a database, with the selection being based, at least in part, upon the data type characteristic of the plurality of data blocks to be ingested and the source location indication of the selected data blocks; and
   performing the data ingestion job on the selected data blocks, with the performance of the data ingestion job including:
      formatting the selected data blocks at the first location by converting the selected data blocks from word processing format for text storage to a database format for text storage to obtain formatted selected data blocks, and
      ingesting, by the selected data ingestion hardware set, the formatted selected data blocks into the database.

2. The method of claim 1 wherein the word processing format is text (TXT) format.

3. The method of claim 1 wherein the word processing format is American Standard Code for Information Interchange (ASCII) format.

* * * * *